United States Patent
Grusy et al.

(10) Patent No.: US 9,244,621 B2
(45) Date of Patent: Jan. 26, 2016

(54) GLOBAL DATA ESTABLISHMENT FOR STORAGE ARRAYS CONTROLLED BY A PLURALITY OF NODES

(71) Applicant: International Business Machines Corporation, Armonk, NY (US)

(72) Inventors: Ellen J. Grusy, Tucson, AZ (US); Kurt A. Lovrien, Tucson, AZ (US); Karl A. Nielsen, Tucson, AZ (US); Jacob L. Sheppard, Queen Creek, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 13/655,058

(22) Filed: Oct. 18, 2012

(65) Prior Publication Data
US 2014/0115253 A1    Apr. 24, 2014

(51) Int. Cl.
*G06F 12/00* (2006.01)
*G06F 3/06* (2006.01)

(52) U.S. Cl.
CPC .............. *G06F 3/0619* (2013.01); *G06F 3/067* (2013.01); *G06F 3/0632* (2013.01); *G06F 3/0689* (2013.01)

(58) Field of Classification Search
CPC .......... G06F 11/1435; G06F 2211/104; G06F 3/0619
USPC .................................................. 711/114, 112
See application file for complete search history.

(56) References Cited

U.S. PATENT DOCUMENTS

| | | |
|---|---|---|
| 5,950,230 A | 9/1999 | Islam et al. |
| 6,411,967 B1 | 6/2002 | Van Renesse |
| 6,985,971 B2 | 1/2006 | Wang et al. |
| 7,200,840 B2 | 4/2007 | Gschwind et al. |
| 7,323,707 B2 | 1/2008 | Dennison |
| 7,444,360 B2 | 10/2008 | Frondozo et al. |
| 7,500,020 B1 | 3/2009 | Kabra et al. |
| 7,546,412 B2 | 6/2009 | Ahmad et al. |
| 7,783,917 B2 | 8/2010 | Sheppard et al. |
| 7,788,526 B2 | 8/2010 | O'Connor |

(Continued)

FOREIGN PATENT DOCUMENTS

| | | |
|---|---|---|
| CN | 1499362 | 5/2004 |
| CN | 101231602 | 7/2008 |
| CN | 101256471 | 9/2008 |

OTHER PUBLICATIONS

PCT International Search Report and Written Opinion dated Mar. 20, 2014 for Application No. PCT/IB2013/058886, filed Sep. 26, 2013.

(Continued)

*Primary Examiner* — Reginald Bragdon
*Assistant Examiner* — Hannah A Faye-Joyner
(74) *Attorney, Agent, or Firm* — Rabindranath Dutta; Konrad Raynes Davda & Victor LLP

(57) ABSTRACT

A plurality of data arrays are coupled to a plurality of nodes via a plurality of adapters. The plurality of adapters discover the plurality of data arrays during startup, and information about the plurality of data arrays are communicated to corresponding local nodes of the plurality of nodes, wherein the local nodes broadcast the information to other nodes of plurality of nodes. A director node of the plurality of nodes determines which data arrays of the plurality of data arrays are a current set of global metadata arrays, based on the broadcasted information.

24 Claims, 9 Drawing Sheets

(56) References Cited

U.S. PATENT DOCUMENTS

| | | |
|---|---|---|
| 7,788,530 B2 | 8/2010 | Kahler et al. |
| 7,945,730 B2 | 5/2011 | Daftardar |
| 8,001,104 B2 | 8/2011 | Frondozo et al. |
| 2002/0073268 A1 | 6/2002 | Peloquin et al. |
| 2003/0149753 A1 | 8/2003 | Lamb |
| 2004/0073659 A1 | 4/2004 | Rajsic et al. |
| 2008/0005470 A1 | 1/2008 | Davies |
| 2008/0209253 A1* | 8/2008 | Sheppard et al. ............... 714/1 |
| 2008/0313416 A1* | 12/2008 | Frondozo et al. ............ 711/162 |
| 2008/0320226 A1 | 12/2008 | Blake et al. |
| 2010/0281163 A1 | 11/2010 | Shi et al. |
| 2011/0106886 A1 | 5/2011 | Nolterieke et al. |
| 2011/0185137 A1 | 7/2011 | Nielsen et al. |
| 2011/0196828 A1 | 8/2011 | Drobychev et al. |
| 2011/0289071 A1 | 11/2011 | Gangadhar |

OTHER PUBLICATIONS

English translation of CN1499362 dated May 26, 2004.
English translation of CN101231602 dated Jul. 30, 2008.
English translation of CN101256471 dated Sep. 3, 2008.
M. Roussopoulos, et al., "CUP: Controlled Update Propagation in Peer-to-Peer Networks", USENIX 2003 Annual Technical Conference, San Antonio Texas, pp. 1-14.
X. Luo, et al., "Study on the Synchronizing Mechanism of Node's Metadata Catalog Service", IEEE, 2009, pp. 877-881.
Application entitled "Validation of Storage Arrays Based on Information Stored in Global Metadata", invented by Ellen J. Grusy et al. pp. 1-30.
Office Action 1, Dec. 22, 2014, for U.S. Appl. No. 13/655,067, filed Oct. 18, 2012 by E.J. Grusy et al., Total 16 pp.
Response to Office Action 1, Mar. 23, 2015, for U.S. Appl. No. 13/655,067, filed Oct. 18, 2012 by E.J. Grusy et al., Total 12 pp. [18.480 (ROA1)].
PCT International Search Report and Written Opinion dated Nov. 25, 2013 for Application No. PCT/EP2013/070089, filed Sep. 26, 2013, 10 pages.
Notice of Allowance, dated Jul. 28, 2015, for U.S. Appl. No. 13/655,067, filed Oct. 18, 2012, invented by Ellen J. Grusy et al, Total 28 pages.
U.S. Appl. No. 14/882,240, filed Oct. 13, 2015 Grusy et al.
Office Action dated Nov. 5, 2015, pp. 19. for U.S. Appl. No. 14/882,240, filed Oct. 13, 2015.
U.S. Appl. No. 14/869,844, filed Sep. 29, 2015 Grusy et al.

* cited by examiner

GLOBAL DATA ESTABLISHMENT FOR STORAGE ARRAYS CONTROLLED BY A PLURALITY OF NODES

BACKGROUND

1. Field

The disclosure relates to a method, system, and article of manufacture for global data establishment for storage arrays controlled by a plurality of nodes.

2. Background

In certain computing environments, a plurality of computational devices may control a plurality of storage devices. The storage devices may comprise hard disk drives, solid state disks, optical disks, etc., and may be configured as a Direct Access Storage Devices (DASD), Redundant Array of Independent Disks (RAID), Just a Bunch of Disks (JBOD), etc.

In such computing environments, system metadata may be maintained in local storage, where in certain situations the system metadata may be needed to determine the configuration of the components of the computing environment. The system metadata may be referred to as global metadata. If the global metadata is corrupted, invalid or unavailable, then the components of the computing environment may have to be reconfigured, potentially resulting in data loss.

SUMMARY OF THE PREFERRED EMBODIMENTS

Provided are a method, a system, and a computer program product in which a plurality of data arrays are coupled to a plurality of nodes via a plurality of adapters. The plurality of adapters discover the plurality of data arrays during startup, and information about the plurality of data arrays are communicated to corresponding local nodes of the plurality of nodes, wherein the local nodes broadcast the information to other nodes of plurality of nodes. A director node of the plurality of nodes determines which data arrays of the plurality of data arrays are a current set of global metadata arrays, based on the broadcasted information.

In further embodiments, the global metadata arrays store global metadata that includes metadata for system configuration.

In additional embodiments, the global metadata arrays are a primary, a secondary, and a tertiary data array. A boot sector of each of the primary, secondary, and tertiary data arrays maintains a pointer record that stores indicators indicating the primary, secondary, and tertiary data arrays and a corresponding reconfiguration count.

In yet additional embodiment the global metadata is maintained in each of the primary, secondary, and tertiary data arrays.

In further embodiments, a node of the plurality of nodes is determined to be a director node. Information about each of the data arrays is collected by the director node. The director node directly or indirectly reads via local and remote adapters, a boot sector of each of the plurality of data arrays to determine which of the plurality of data arrays has a pointer record in the boot sector pointing to potential global metadata arrays.

In yet further embodiments, boot sectors with highest reconfiguration counts are used to determine three arrays of the plurality of data arrays, wherein the three arrays are configured as the current global metadata arrays.

In additional embodiments, an adapter couples a local node to a data array, and to determine the current set of global metadata arrays, the director node reads data on one or more of the plurality of data arrays, via adapters connected to other nodes.

In further embodiments, each data array of the plurality of data arrays is owned by at least one but not by all of the plurality of nodes.

BRIEF DESCRIPTION OF THE DRAWINGS

Referring now to the drawings in which like reference numbers represent corresponding parts throughout.

DETAILED DESCRIPTION

Figure 1:
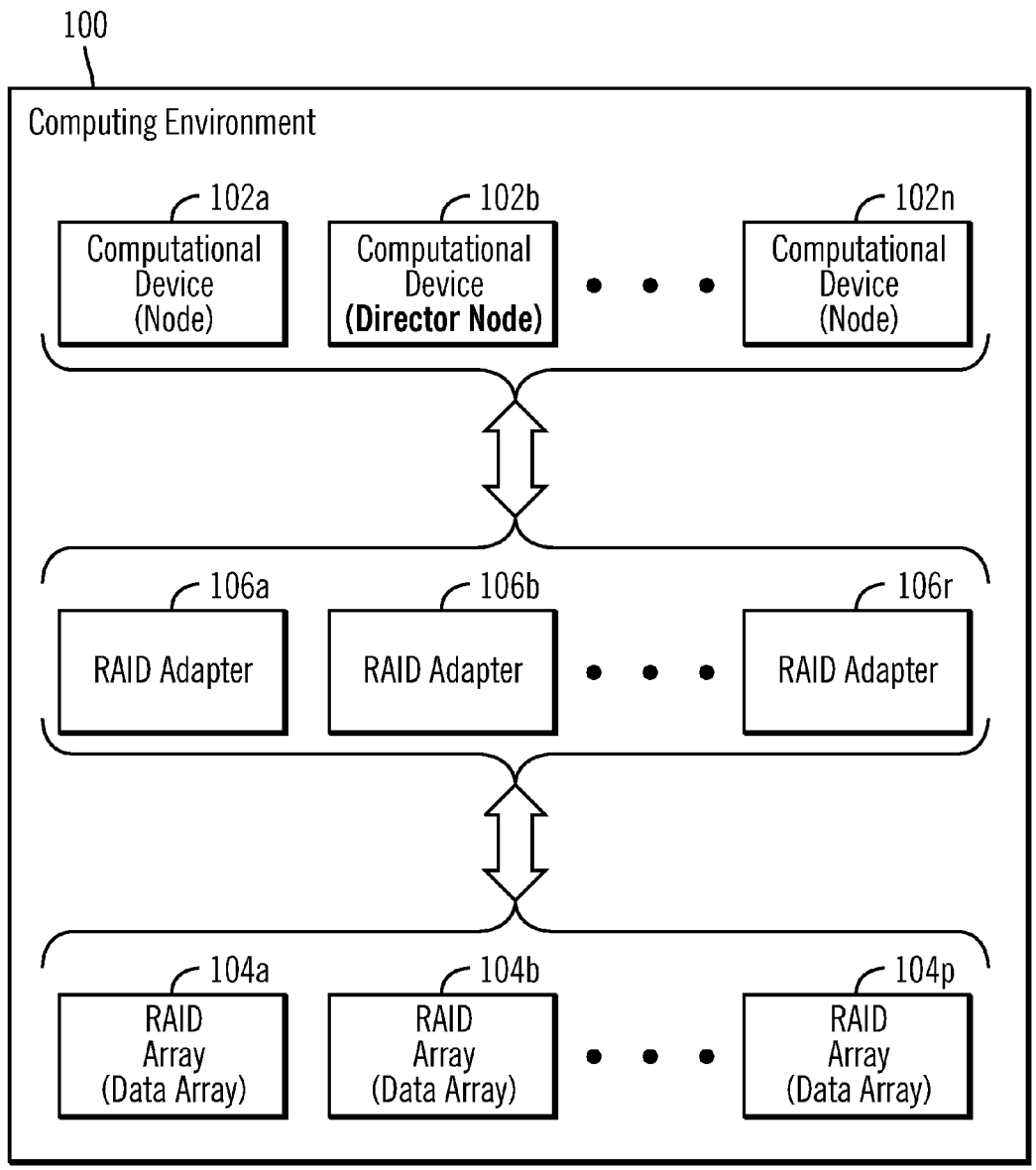
FIG. 1 illustrates a block diagram of a computing environment that includes a plurality of nodes coupled to a plurality of RAID arrays via a plurality of RAID adapters, in accordance with certain embodiments.

In the following description, reference is made to the accompanying drawings which form a part hereof and which illustrate several embodiments. It is understood that other embodiments may be utilized and structural and operational changes may be made.

In a storage subsystem, global metadata may be stored persistently in a reserved area in order to preserve the memory of volumes, ranks, logical subsystems, copy service relationships, cache bitmaps, and other entities in the system. Reserved space is allocated on every Redundant Array of Independent Disks (RAID) array in the storage subsystem to store global metadata. However, space is used in three RAID arrays (referred to as global metadata arrays) that are selected to store the global metadata. The three RAID arrays (global metadata arrays) are also referred to as a primary, a secondary and a tertiary RAID array. In alternative embodiments, a fewer or a greater number of global metadata arrays may be used, i.e., there may be fewer than three or more than three global metadata arrays. Three global metadata arrays have been used in the disclosure for describing certain embodiments. If a global metadata array fails or a better array becomes available than one in the current set of global metadata arrays, a new global data array is selected to store global metadata in its reserved area. When a new global data array is selected, the set of global metadata is copied to the new RAID array from one of the existing global metadata arrays.

At system start up time, a determination may be made as to which three arrays contain the current set of global metadata tracks in their reserved areas. To aid in global metadata array determination, the list of current primary, secondary, and tertiary array serial numbers, and the time stamp and reconfiguration counts are stored in multiple places in the system, in pointer records. This "pointer," record containing global metadata array serial numbers, reconfiguration count and timestamp may be stored in the last sector, known as the boot sector, of each current global metadata array.

As global metadata reassignments occur under less than ideal situations, global metadata pointer records may become out of date. While any single pointer record does not provide enough evidence to select the set of global metadata arrays since it may be stale, in certain situations, multiple pointer records can provide adequate proof. An example in which global metadata pointers may be out of date occurs if a global metadata array fails while one processing unit is not operational, and a global metadata reassignment may be performed. This leads to a situation where one or more processing units in a multi-node system may have out of date global metadata pointer records, Furthermore, as arrays are removed from the current set of global metadata arrays, their boot sectors are invalidated so that they may not be selected in a future boot sequence. However, when an array fails, it may not be possible to immediately invalidate its boot sector, so at boot time, many arrays may point to themselves as being in the current set of global metadata.

Certain embodiments provide mechanisms for maintaining global metadata in three RAID arrays of a plurality of RAID arrays, where the three RAID arrays have a pointer record in the boot sector that includes pointers to each of the three RAID arrays, reconfiguration counts, and timestamps. If a system goes down, and then is operational once again, then certain embodiments allow the selection of the same set of global metadata arrays that were previously used. The global metadata may then be used for reconfiguring the system.

Certain embodiments provide mechanisms for collaboration of multiple processing units, or nodes, in the selection of the set of global metadata arrays. Logical connections to each array allow logical reads of boot sectors, and allow recovery from errors. Additionally, resource lists are shared among all nodes so each node sees the exact same list of resources. Regardless of which node makes the determination of the global metadata arrays, the selected set of global metadata arrays is the same.

Exemplary Embodiments

FIG. 1 illustrates a block diagram of a computing environment 100, in accordance with certain embodiments. One or more nodes 102a, 102b, ... 102n are coupled to a plurality of data arrays, such as RAID arrays 104a, 104b, ... 104p, via a plurality of adapters, such as RAID adapters 106a, 106b, ... 106r.

The nodes 102a ... 102n may comprise any suitable computational device known in the art, such as a personal computer, a workstation, a server, a mainframe, a hand held computer, a palm top computer, a telephony device, network appliance, etc. While FIG. 1 shows that the plurality of data arrays are RAID arrays 104a ... 104p, in alternative embodiments the data arrays may comprise any suitable storage devices known in the art, where the suitable storage devices may be configured in other configurations such as DASD, JBOD, etc., that are different from RAID.

Communications in the computing environment 100 may take place via various mechanisms, including communications over a network (not shown), such as a Local Area Network (LAN), a Storage Area Network (SAN), a Wide Area Network (WAN), a wireless network, etc. The plurality of adapters 106a . . . 106r may create dual loops coupling the RAID arrays 104a . . . 104p to the computational device 102a . . . 102n.

Each of the plurality of RAID arrays 104a . . . 104p may include one or more disk components. Each disk component may comprise a data disk, a parity disk, or any other type of disk or component.

In certain embodiments, three RAID arrays of the plurality of RAID arrays 104a . . . 104p store the global metadata. The three RAID arrays may be used to store the global metadata redundantly. For example, in certain embodiments the global metadata may be mirrored in each of three RAID arrays. While in certain embodiments the data stored in the three RAID arrays include global metadata, in alternative embodiments other types of data or metadata may be stored in the RAID arrays.

A single node of the plurality of nodes 102a . . . 102n may be referred to as a director node. In FIG. 1, reference numeral 102b is an exemplary director node. In alternative embodiments, any of the plurality of nodes 102a . . . 102n may be determined to be the director node.

Therefore, FIG. 1 illustrates certain embodiments in which a plurality of nodes including a director node is coupled to a plurality of RAID arrays via a plurality of RAID adapters. Three of the plurality of RAID arrays store global metadata in a reserved area.

Figure 2:
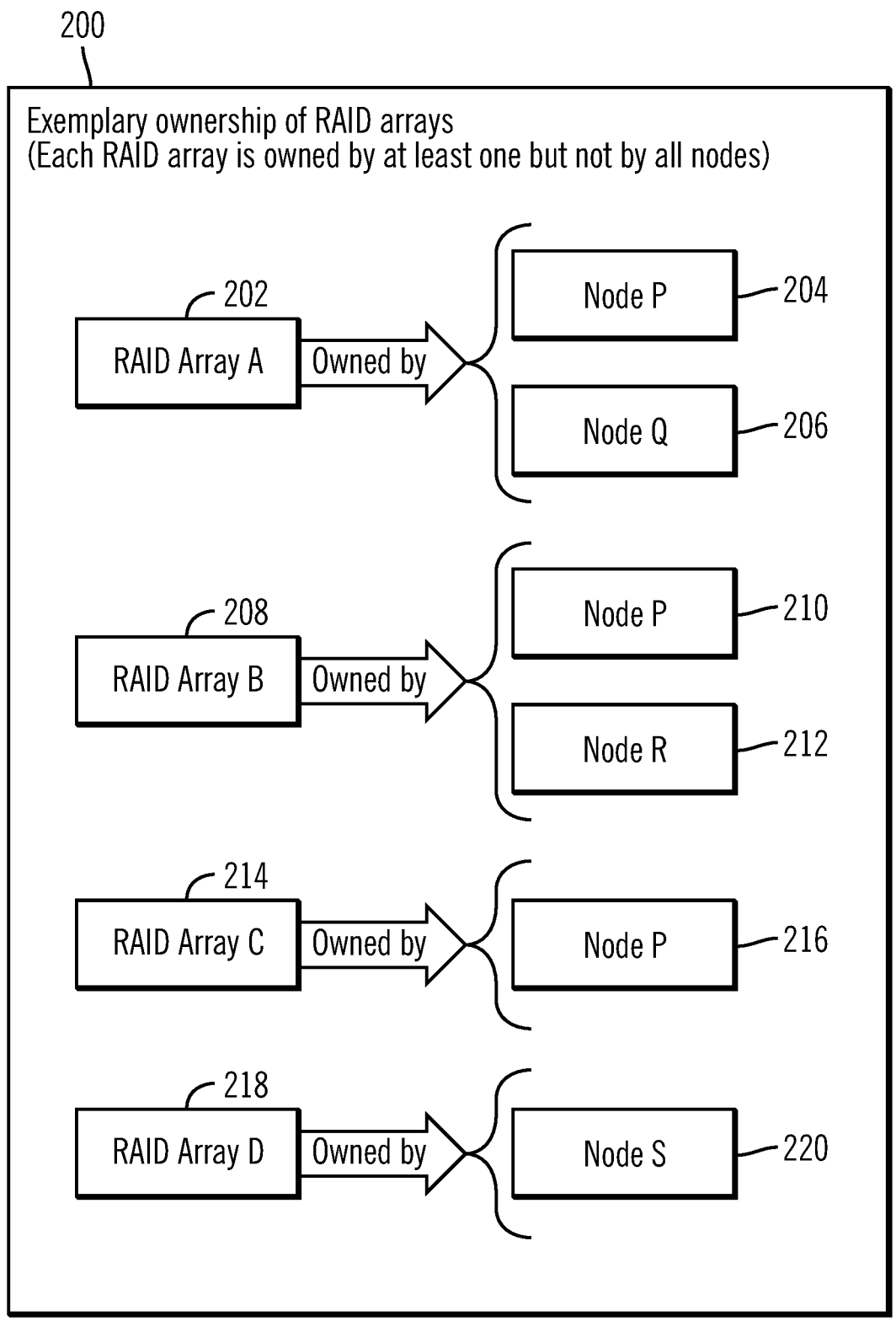
FIG. 2 illustrates a block diagram that shows exemplary ownership of RAID arrays in which each RAID array is owned by at least one but not by all nodes, in accordance with certain embodiments.

FIG. 2 illustrates a block diagram that shows exemplary ownership of RAID arrays in which each RAID array is owned by at least one but not by all nodes, in accordance with certain embodiments. In FIG. 2 exemplary RAID array A is owned by exemplary nodes P, Q as shown via reference numerals 202, 204, 206. Exemplary RAID array B is owned by exemplary nodes P, R as shown via reference numerals 208, 210, 212. Exemplary RAID array C is owned by node P as shown via reference numerals 214 and 216. Exemplary RAID array D is owned by node S as shown via reference numerals 218, 220.

In FIG. 2, it can be seen that each RAID array is owned by at least one but not by all nodes. In the example, shown in FIG. 2, if node P wants to communicate with RAID array D, then node P has to know which adapter owns the RAID array D and which node talks to that adapter. It should be noted that while adapter to array relationship is fixed, adapter to node relationship can vary based on node availability.

It should be noted that in certain embodiments, certain RAID arrays may be connected to more than one adapter. So, a given node could possibly have a local adapter and a remote adapter with access to the same RAID array. In other embodiments, a given node could possibly have a local adapter and two remote adapters with access to the same RAID array. There may be many different types of configurations of RAID arrays, adapters, and nodes.

Figure 3:
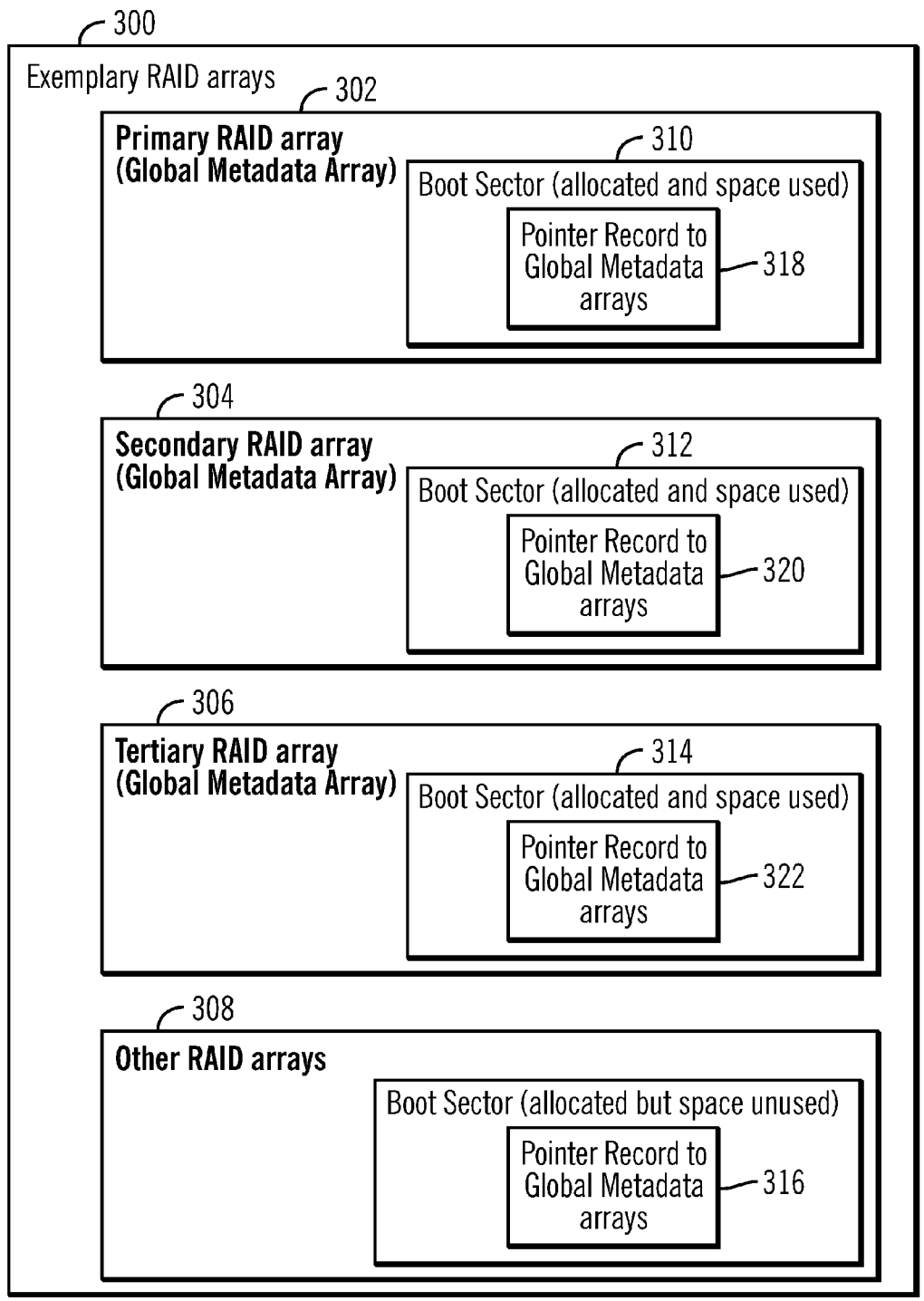
FIG. 3 illustrates a block diagram that shows at least a primary, a secondary, and a tertiary RAID array, in accordance with certain embodiments.

FIG. 3 illustrates a block diagram 300 that shows at least a primary 302, a secondary 304, and a tertiary 306 RAID array, in accordance with certain embodiments. Additional RAID arrays 308 are also shown. The RAID arrays 302, 304, 306, 308 may correspond to the RAID arrays 104a . . . 104p of FIG. 1.

The RAID arrays 302, 304, 306 are referred to as primary, secondary, and tertiary RAID arrays respectively. Each of the RAID arrays 302, 304, 306 are also referred to as a global metadata array, as each of the RAID arrays 302, 304, 306 store global metadata. In alternative embodiments, there may be a different number of global metadata arrays. The global metadata arrays 302, 304, 306 each have a boot sector 310, 312, 314 that is allocated, where pointer records 318, 320, 322 pointing to global metadata arrays are stored. The other RAID arrays 308 have a boot sector that is allocated, but space is left unused as no pointer records are stored.

Figure 4:
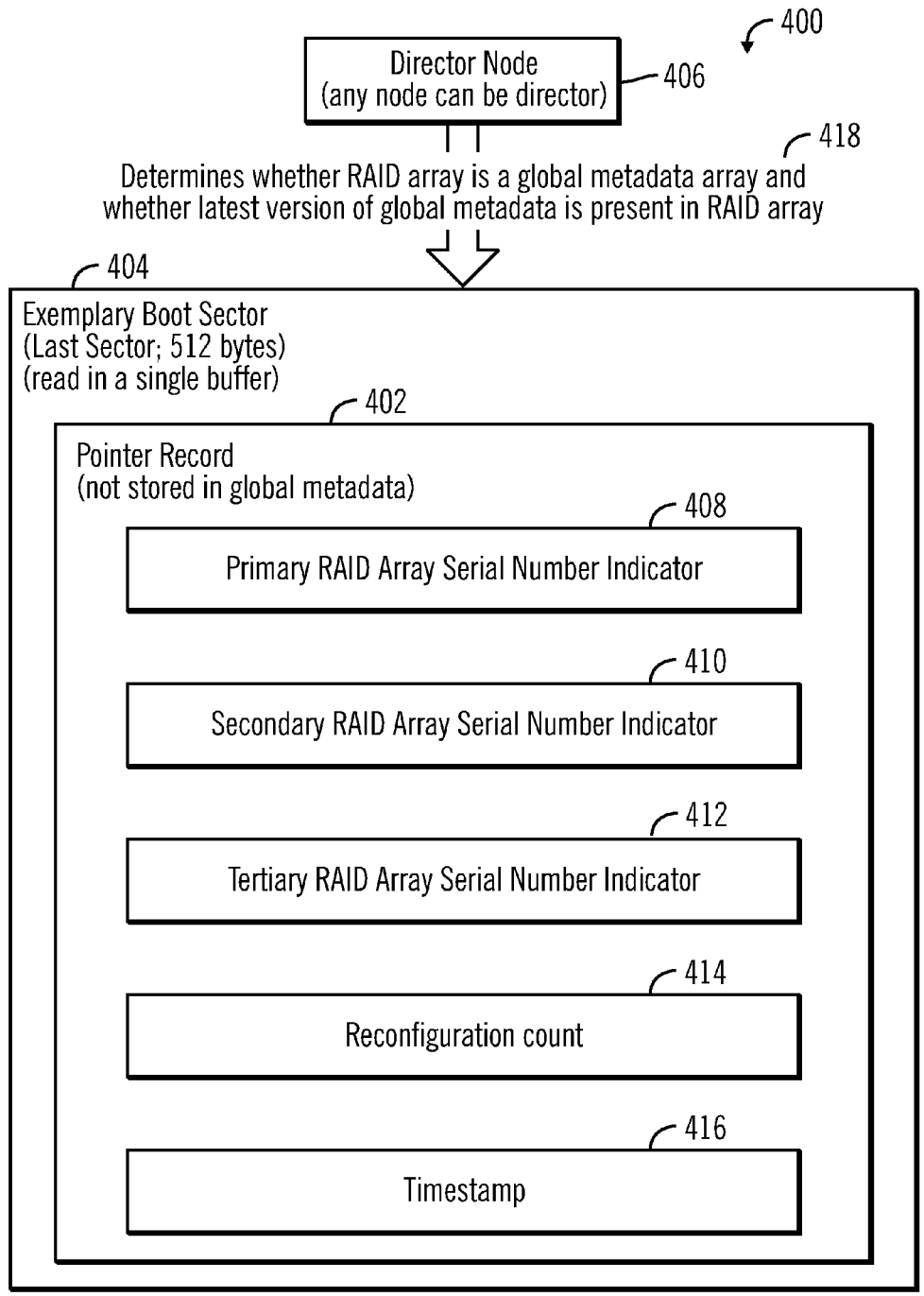
FIG. 4 illustrates a block diagram that shows an exemplary pointer record in an exemplary boot sector of a RAID array, and a director node, in accordance with certain embodiments.

FIG. 4 illustrates a block diagram 400 that shows an exemplary pointer record 402 in an exemplary boot sector 404 of a RAID array, and a director node 406, in accordance with certain embodiments. The director node 406 is selected from the plurality of nodes 102a . . . 102n of FIG. 1. The director node 406 may be determined by executing code in the computing environment 100. The exemplary pointer record 402 shown in FIG. 4 is not stored in the global metadata.

FIG. 4 shows that the pointer record 402 includes primary, secondary, and tertiary RAID array serial number indicators 408, 410, 412 that point to the primary, secondary, and tertiary RAID arrays (i.e., the global metadata arrays). The reconfiguration count 414 is a counter that is increased when global metadata is updated and the timestamp 416 indicates the time when the global metadata is updated. Since the exemplary pointer record 402 is not stored in the global metadata, the primary, secondary and tertiary RAID array serial number indicators 408, 410, 412, the reconfiguration count 414, and the timestamp 416 are not stored in the global metadata.

As shown in FIG. 4, in certain embodiments, the director node 406 determines (reference numeral 418) whether a RAID array is a global metadata array and whether the latest version of global metadata is present in RAID array.

Figure 5:
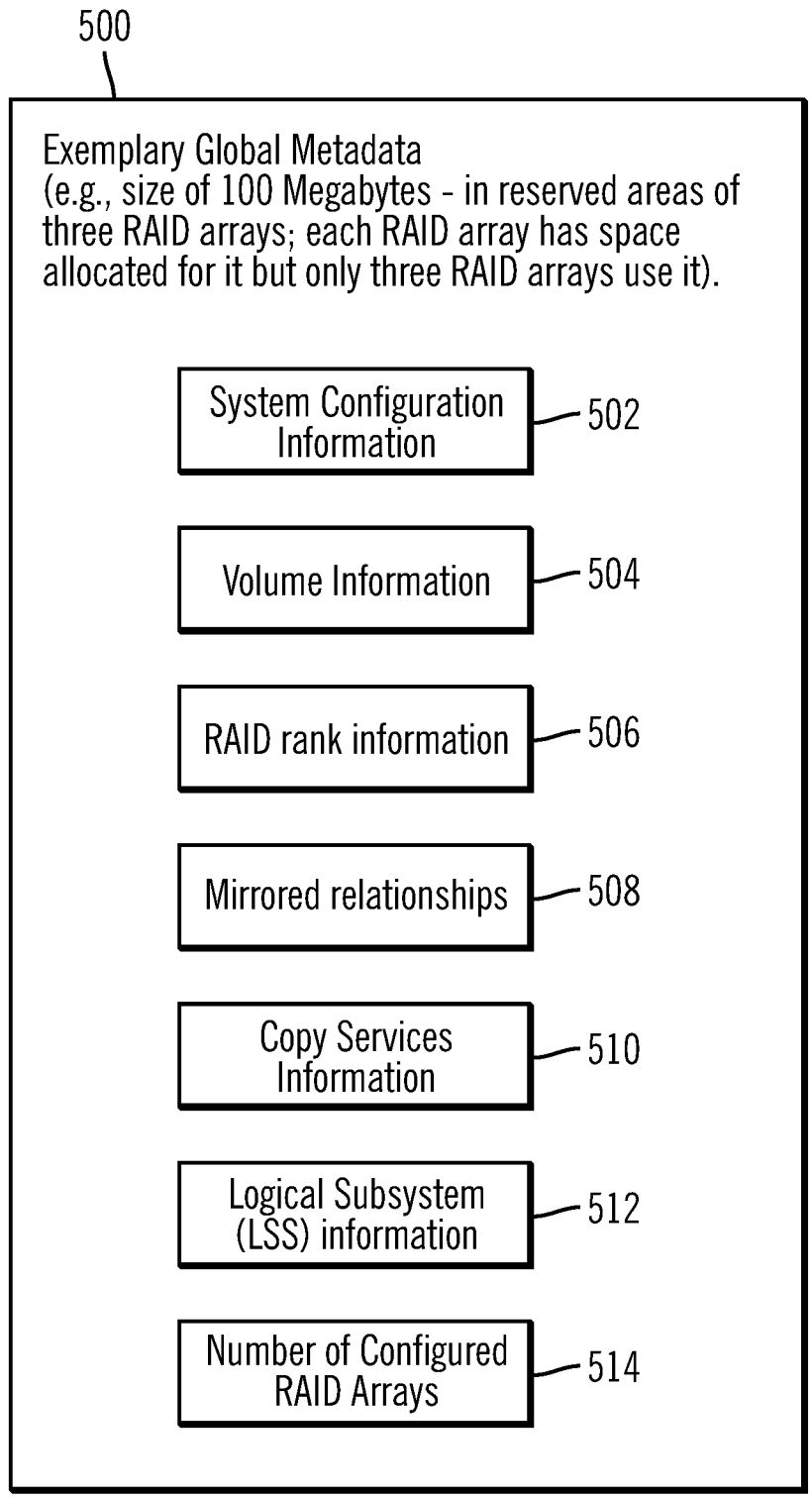
FIG. 5 illustrates a block diagram that shows exemplary global metadata, in accordance with certain embodiments.

FIG. 5 illustrates a block diagram 500 that shows exemplary global metadata, in accordance with certain embodiments. The exemplary global metadata may in certain embodiments have a size allocation of 100 megabytes, in comparison to the boot sector 404 which may be of 512 bytes. The global metadata may store system configuration information 502, volume information 504, RAID rank information 506, mirrored relationships 508, copy services information 510, logical subsystem information 512, and the number of configured RAID arrays 514. Other information may also be stored in the global metadata. The global metadata may be used to store system configuration information.

Figure 6:
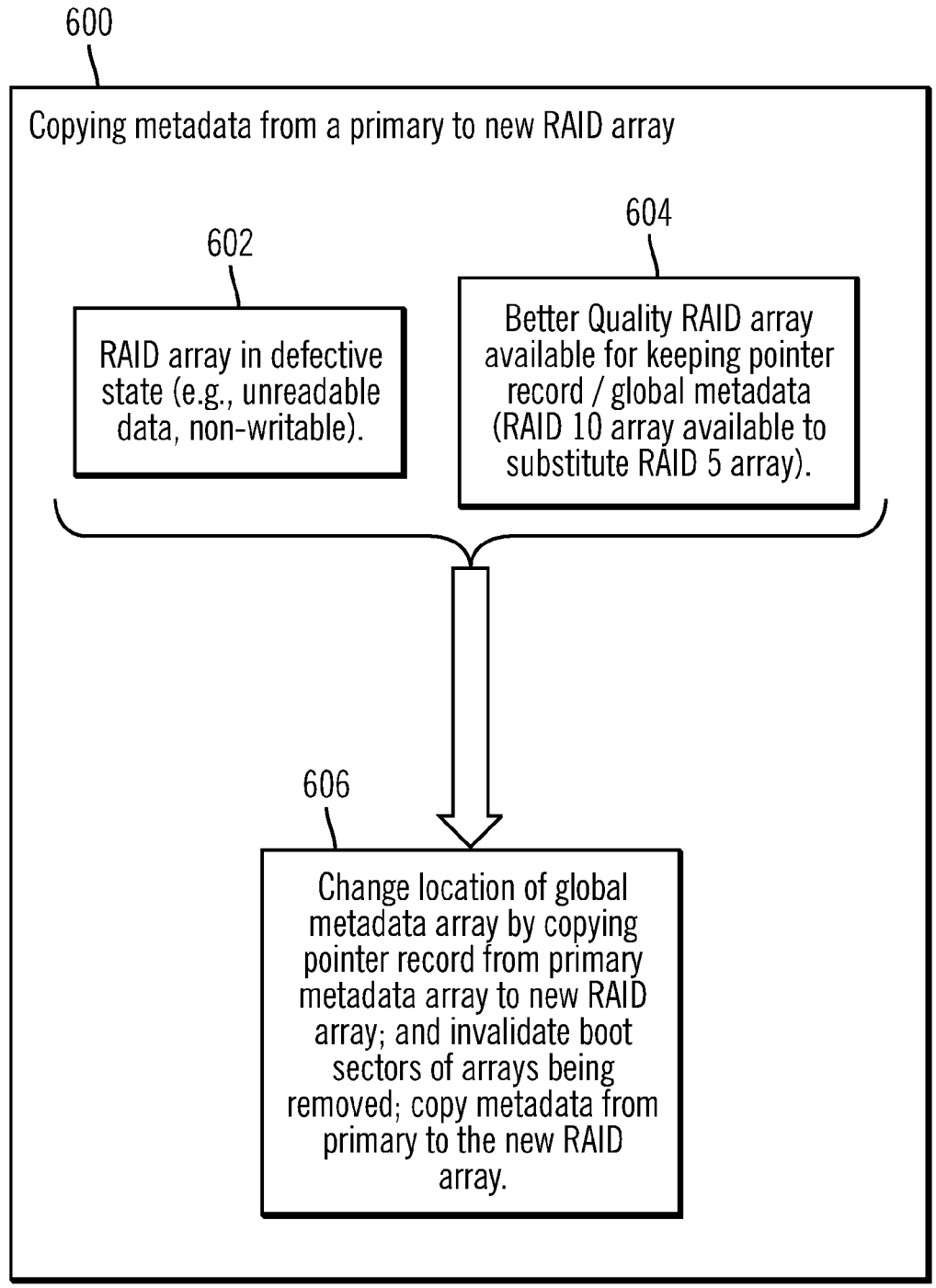
FIG. 6 illustrates a block diagram that shows how metadata may be copied from a primary to a new RAID array in a computing environment, in accordance with certain embodiments.

FIG. 6 illustrates a block diagram 600 that shows how a global metadata array may be copied from a primary to a new RAID array in a computing environment, in accordance with certain embodiments. In certain embodiments, a RAID array may be in a defective state and may be unreadable or in a state in which data cannot be written to the RAID array (reference numeral 602). In certain embodiments, a better quality RAID array may be available for keeping pointer record of global metadata and storing the global metadata (reference numeral 604). For example, a RAID 10 array may be preferred over a RAID 5 array.

In certain embodiments, the location of global metadata array may be changed by copying pointer records from primary, secondary, or tertiary RAID arrays to new RAID arrays. The boot sectors of the old RAID arrays are invalidated, and the global metadata is copied from primary, secondary and/or tertiary RAID arrays to the new RAID arrays and the boots sectors of the new RAID arrays are configured (reference numeral 606).

Figure 7:
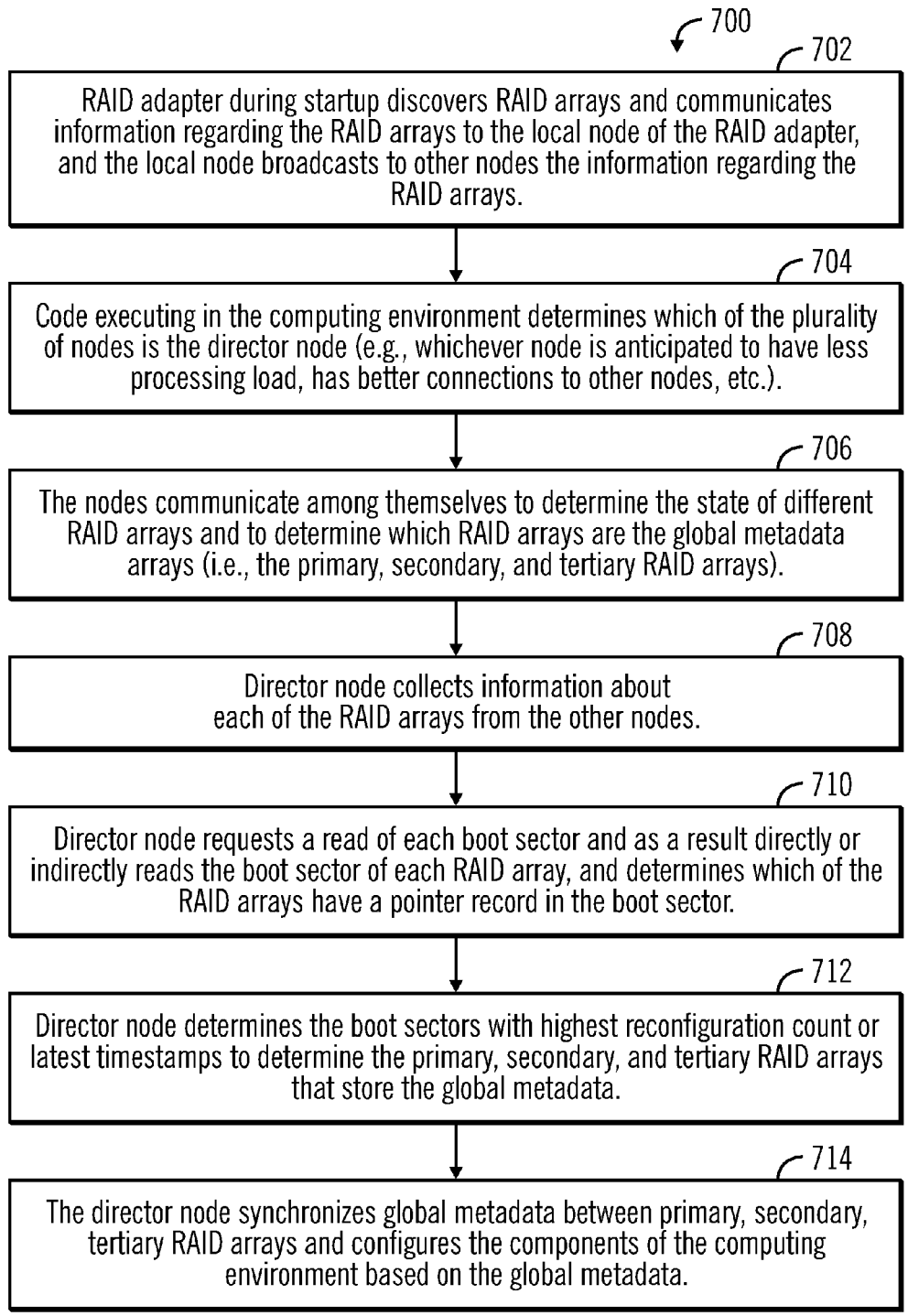
FIG. 7 illustrates a first flowchart that shows operations performed in the computing environment, in accordance with certain embodiments.

FIG. 7 illustrates a first flowchart 700 that shows operations performed in the computing environment 100, in accordance with certain embodiments.

Control starts at block 702, in which RAID adapter during startup discovers RAID arrays and communicates information regarding the RAID arrays to the local node of the RAID adapter, and the local node broadcasts to other nodes the information regarding the RAID arrays. The local node is the node which the RAID adapter couples to a RAID array. Code executing in the computing environment 100 determines (at block 704) which of the plurality of nodes is the director node, The director node may be anticipated as having a less processing load or may have better connections to other nodes.

The nodes communicate among themselves to determine (at block 706) the state of different RAID arrays and determine which RAID arrays are to be the global metadata arrays (i.e., the primary, secondary, and tertiary RAID arrays).

The director node collects (at block 708) information about each of the RAID arrays from the other nodes, and requests a read of each boot sector and as a result directly or indirectly reads (at block 710) (i.e., logically reads) the boot sector of each RAID array and determines which of the RAID arrays have a pointer record in the boot sector. It may be noted that in certain embodiments the reading (at block 710) may be performed indirectly or directly. For example, in an indirect read the director node makes a request to another node that is directly attached to the RAID array, and that node performs the read and passes the data back to the director node. The director node then determines (at block 712) the boot sectors with highest reconfiguration count or latest timestamps to determine the primary, secondary, and tertiary RAID arrays that store the global metadata. The director node then synchronizes (at block 714) global metadata between (at block 714) primary, secondary, tertiary RAID arrays and configures the components of the computing environment 100 based on the global metadata.

Figure 8:
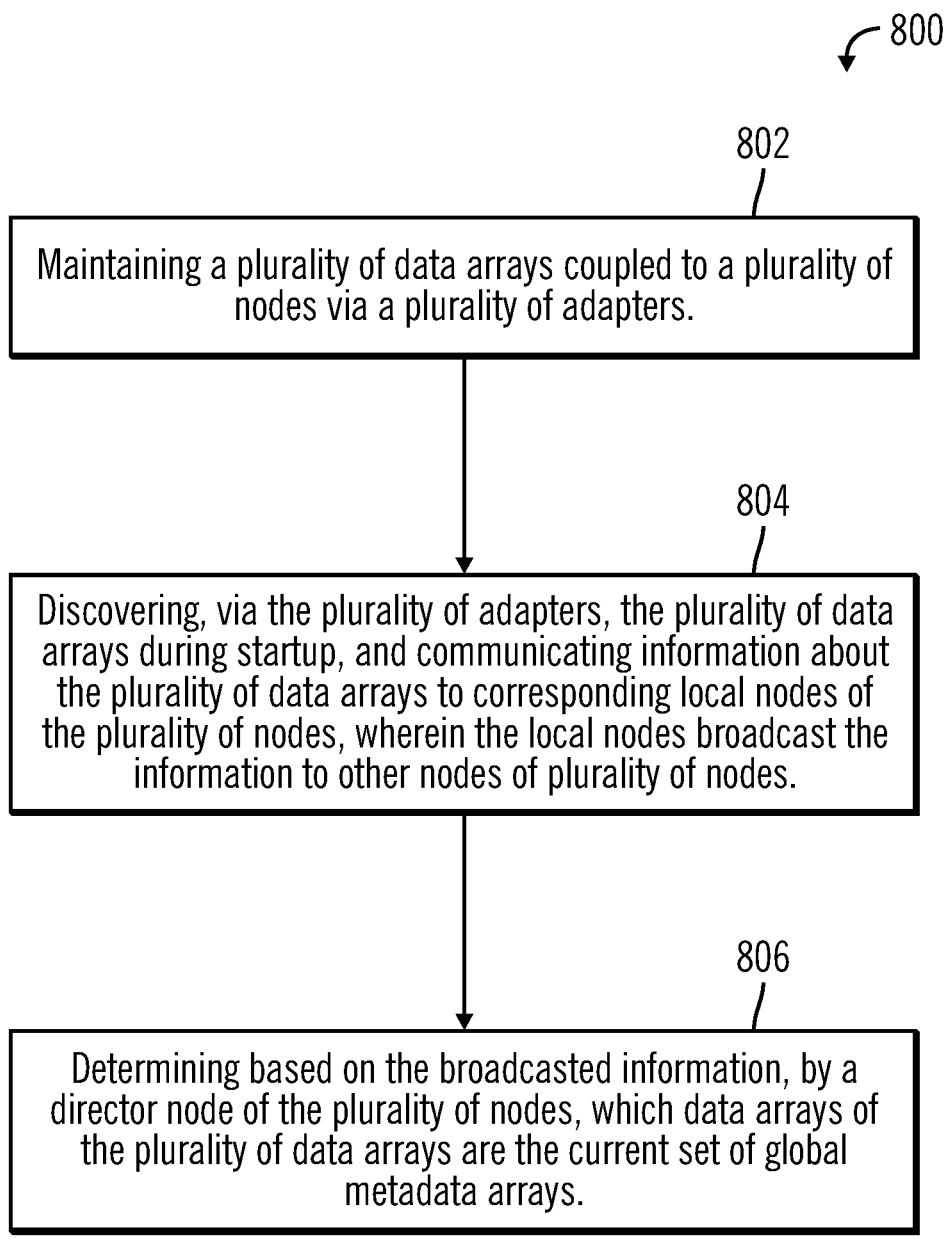
FIG. 8 illustrates a second flowchart that shows operations performed in the computing environment, in accordance with certain embodiments.

FIG. 8 illustrates a second flowchart 800 that shows operations performed in the computing environment, in accordance with certain embodiments. Control starts at block 802, in which a plurality of data arrays coupled to a plurality of nodes via a plurality of adapters are maintained. The plurality of adapters discover the plurality of data arrays during startup, and information about the plurality of data arrays are communicated to corresponding local nodes of the plurality of nodes, wherein the local nodes broadcast the information to other nodes of plurality of nodes (at block 804). A director node of the plurality of nodes determines (at block 806) which data arrays of the plurality of data arrays are the current global metadata arrays. In certain embodiments, the global metadata arrays store global metadata that includes metadata for system configuration. In additional embodiments, the data arrays are a primary, a secondary, and a tertiary data array. A boot sector of each of the primary, secondary, and tertiary data arrays maintains a pointer record that stores indicators indicating the primary, secondary, and tertiary data array and a corresponding reconfiguration count.

Therefore, FIGS. 1-8 illustrate certain embodiments, in which full collaboration of multiple nodes occur in the selection of global metadata array set during system initialization. Logical connections are established from each node to each array via adapters, enabling reads of boot sectors and error recovery prior to reading rank configuration metadata, Mirroring of resource lists are made among each node enabling uniform selection of the global metadata array.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
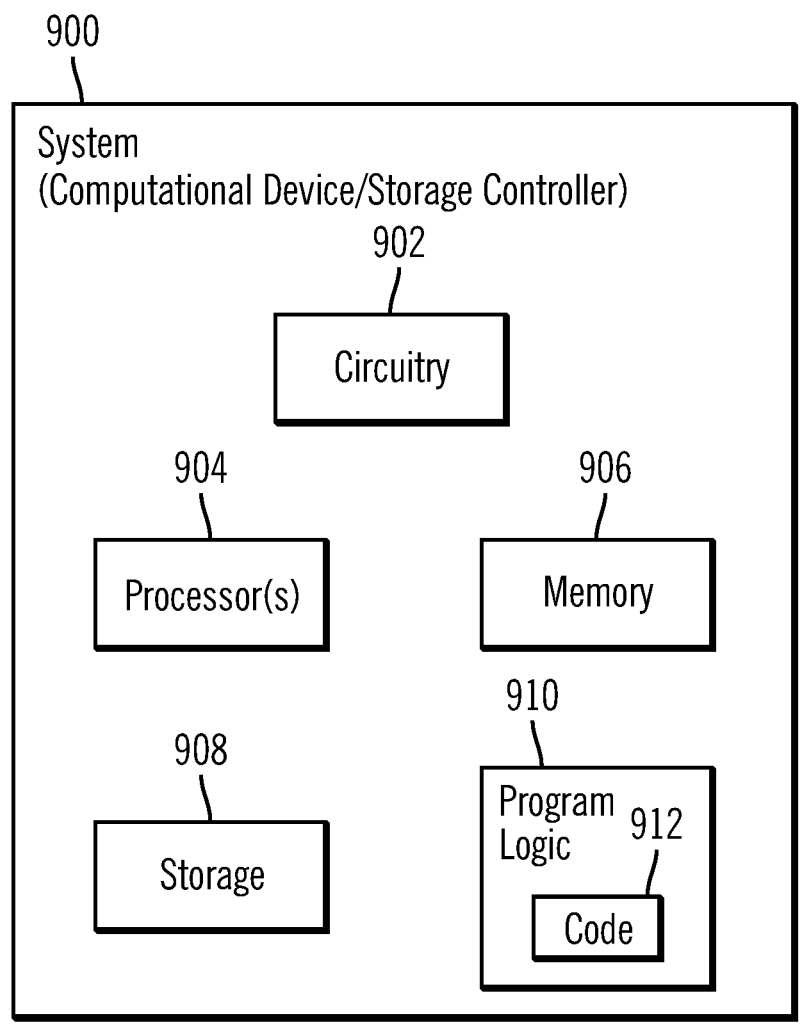
FIG. 9 illustrates a block diagram of a computational system that shows certain elements that may be included in at least the nodes of FIG. 1, in accordance with certain embodiments.

FIG. 9 illustrates a block diagram that shows certain elements that may be included in the nodes $102a, \ldots, 102n$ or RAID adapters $106a \ldots 106r$ in accordance with certain embodiments. The system 900 may comprise the nodes $102a \ldots 102n$ or RAID adapters $106a \ldots 106r$ and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a plurality of data arrays coupled to a plurality of nodes via a plurality of adapters;
   determining which of the plurality of nodes is a director node, wherein the director node has better connections to other nodes of the plurality of nodes;
   discovering, via the plurality of adapters, the plurality of data arrays during startup, and communicating information about the plurality of data arrays to corresponding local nodes of the plurality of nodes, wherein the local nodes broadcast the information to other nodes of plurality of nodes; and
   determining based on the broadcasted information, by the director node of the plurality of nodes, which data arrays of the plurality of data arrays are a current set of global metadata arrays comprising a primary, a secondary, and a tertiary data arrays, wherein the director node synchronizes global metadata between the primary, the secondary, and the tertiary data arrays and configures components of a computing environment based on the global metadata, wherein each of the primary, the secondary, and the tertiary data arrays have a boot sector that stores pointer records pointing to the current set of global metadata arrays comprising the primary, the secondary, and the tertiary data arrays, and wherein boot sectors of other data arrays besides the global metadata arrays do not store pointer records pointing to the current set of global metadata arrays.

2. The method of claim 1, the method further comprising:
   collecting the information about each of the data arrays by the director node;
   directly or indirectly reading via local and remote adapters, by the director node, a boot sector of each of the plurality of data arrays to determine which of the plurality of data arrays has a pointer record in the boot sector pointing to potential global metadata arrays; and
   determining, boot sectors with highest reconfiguration counts to determine three arrays of the plurality of data arrays that are configured as the current set of global metadata arrays.

3. The method of claim 1, wherein logical connections are established from each node of the plurality of nodes via one or more adapters of the plurality of adapter to enable reads of boot sectors and perform error recovery prior to reading of the global metadata, and wherein if a better quality data array is available for storing the global metadata then the global metadata is stored in the better quality data array.

4. The method of claim 1, wherein the pointer records in the boot sector of the primary, secondary and tertiary data arrays store indicators corresponding to the serial numbers of the primary, the secondary and the tertiary data arrays, and wherein the pointer records in the boot sector of the primary, secondary and tertiary data arrays store also store a reconfiguration count and a timestamp, the method further comprising:
   determining by the director node whether a data array is a global metadata array and whether a latest version of the global metadata is present in the data array.

5. The method of claim 1, wherein if a better quality data array in comparison to the primary data array is available for storing the global metadata then the global metadata is stored in the better quality data array in preference to the primary data array, wherein a location of the global metadata array is changed by copying a pointer record from primary metadata array to the new RAID array, and wherein the global metadata is copied from the primary data array to the new RAID array.

6. The method of claim 1, wherein each data array of the plurality of data arrays is owned by at least one but not by all of the plurality of nodes.

7. A system, wherein a plurality of data arrays are coupled to a plurality of nodes via a plurality of adapters, the system comprising:
  a memory; and
  a processor coupled to the memory, wherein the processor performs operations, the operations comprising:
    determining which of the plurality of nodes is a director node, wherein the director node has better connections to other nodes of the plurality of nodes;
    discovering, via the plurality of adapters, the plurality of data arrays during startup, and communicating information about the plurality of data arrays to corresponding local nodes of the plurality of nodes, wherein the local nodes broadcast the information to other nodes of plurality of nodes; and
    determining based on the broadcasted information, by the director node of the plurality of nodes, which data arrays of the plurality of data arrays are a current set of global metadata arrays comprising a primary, a secondary, and a tertiary data arrays, and wherein the director node synchronizes global metadata between the primary, the secondary, and the tertiary data arrays and configures components of a computing environment based on the global metadata, wherein each of the primary, the secondary, and the tertiary data arrays have a boot sector that stores pointer records pointing to the current set of global metadata arrays comprising the primary, the secondary, and the tertiary data arrays, and wherein boot sectors of other data arrays besides the global metadata arrays do not store pointer records pointing to the current set of global metadata arrays.

8. The system of claim 7, the operations further comprising:
  collecting the information about each of the data arrays by the director node;
  directly or indirectly reading via local and remote adapters, by the director node, a boot sector of each of the plurality of data arrays to determine which of the plurality of data arrays has a pointer record in the boot sector pointing to potential global metadata arrays; and
  determining, boot sectors with highest reconfiguration counts to determine three arrays of the plurality of data arrays that are configured as the current set of global metadata arrays.

9. The system of claim 7, wherein logical connections are established from each node of the plurality of nodes via one or more adapters of the plurality of adapter to enable reads of boot sectors and perform error recovery prior to reading of the global metadata, and wherein if a better quality data array is available for storing the global metadata then the global metadata is stored in the better quality data array.

10. The system of claim 7, wherein the pointer records in the boot sector of the primary, secondary and tertiary data arrays store indicators corresponding to the serial numbers of the primary, the secondary and the tertiary data arrays, and wherein the pointer records in the boot sector of the primary, secondary and tertiary data arrays store also store a reconfiguration count and a timestamp, the method further comprising:
  determining by the director node whether a data array is a global metadata array and whether a latest version of the global metadata is present in the data array.

11. The system of claim 7, wherein if a better quality data array in comparison to the primary data array is available for storing the global metadata then the global metadata is stored in the better quality data array in preference to the primary data array, wherein a location of the global metadata array is changed by copying a pointer record from primary metadata array to the new RAID array, and wherein the global metadata is copied from the primary data array to the new RAID array.

12. The system of claim 7, wherein each data array of the plurality of data arrays is owned by at least one but not by all of the plurality of nodes.

13. A computer program product, the computer program product comprising a non-transitory computer readable storage medium having computer readable program code embodied therewith, the computer readable program code configured to perform operations, the operations comprising:
  maintaining a plurality of data arrays coupled to a plurality of nodes via a plurality of adapters;
  determining which of the plurality of nodes is a director node, wherein the director node has better connections to other nodes of the plurality of nodes;
  discovering, via the plurality of adapters, the plurality of data arrays during startup, and communicating information about the plurality of data arrays to corresponding local nodes of the plurality of nodes, wherein the local nodes broadcast the information to other nodes of plurality of nodes; and
  determining based on the broadcasted information, by the director node of the plurality of nodes, which data arrays of the plurality of data arrays are a current set of global metadata arrays comprising a primary, a secondary, and a tertiary data arrays, and wherein the director node synchronizes global metadata between the primary, the secondary, and the tertiary data arrays and configures components of a computing environment based on the global metadata, wherein each of the primary, the secondary, and the tertiary data arrays have a boot sector that stores pointer records pointing to the current set of global metadata arrays comprising the primary, the secondary, and the tertiary data arrays, and wherein boot sectors of other data arrays besides the global metadata arrays do not store pointer records pointing to the current set of global metadata arrays.

14. The computer program product of claim 13, the operations further comprising:
  collecting the information about each of the data arrays by the director node;
  directly or indirectly reading via local and remote adapters, by the director node, a boot sector of each of the plurality of data arrays to determine which of the plurality of data arrays has a pointer record in the boot sector pointing to potential global metadata arrays; and
  determining, boot sectors with highest reconfiguration counts to determine three arrays of the plurality of data arrays that are configured as the current set of global metadata arrays.

15. The computer program product of claim 13, wherein logical connections are established from each node of the plurality of nodes via one or more adapters of the plurality of adapter to enable reads of boot sectors and perform error recovery prior to reading of the global metadata, and wherein if a better quality data array is available for storing the global metadata then the global metadata is stored in the better quality data array.

16. The computer program product of claim 13, wherein the pointer records in the boot sector of the primary, secondary and tertiary data arrays store indicators corresponding to the serial numbers of the primary, the secondary and the tertiary data arrays, and wherein the pointer records in the boot sector of the primary, secondary and tertiary data arrays store also store a reconfiguration count and a timestamp, the method further comprising:

determining by the director node whether a data array is a global metadata array and whether a latest version of the global metadata is present in the data array.

17. The computer program product of claim 13, wherein if a better quality data array in comparison to the primary data array is available for storing the global metadata then the global metadata is stored in the better quality data array in preference to the primary data array, wherein a location of the global metadata array is changed by copying a pointer record from primary metadata array to the new RAID array, and wherein the global metadata is copied from the primary data array to the new RAID array.

18. The computer program product of claim 13, wherein each data array of the plurality of data arrays is owned by at least one but not by all of the plurality of nodes.

19. A system, comprising:
   a plurality of nodes;
   a plurality of adapters;
   a plurality of data arrays coupled to the plurality of nodes via the plurality of adapters, wherein the system performs operations, the operations comprising:
   determining which of the plurality of nodes is a director node, wherein the director node has better connections to other nodes of the plurality of nodes;
   discovering, via the plurality of adapters, the plurality of data arrays during startup, and communicating information about the plurality of data arrays to corresponding local nodes of the plurality of nodes, wherein the local nodes broadcast the information to other nodes of plurality of nodes; and
   determining based on the broadcasted information, by the director node of the plurality of nodes, which data arrays of the plurality of data arrays are a current set of global metadata arrays, wherein the director node reads data on one or more of the plurality of data arrays, at least via adapters connected to other nodes comprising a primary, a secondary, and a tertiary data arrays, and wherein the director node synchronizes global metadata between the primary, the secondary, and the tertiary data arrays and configures components of a computing environment based on the global metadata, wherein each of the primary, the secondary, and the tertiary data arrays have a boot sector that stores pointer records pointing to the current set of global metadata arrays comprising the primary, the secondary, and the tertiary data arrays, and wherein boot sectors of other data arrays besides the global metadata arrays do not store pointer records pointing to the current set of global metadata arrays.

20. The system of claim 19, wherein logical connections are established from each node of the plurality of nodes via one or more adapters of the plurality of adapter to enable reads of boot sectors and perform error recovery prior to reading of the global metadata, and wherein if a better quality data array is available for storing the global metadata then the global metadata is stored in the better quality data array.

21. The system of claim 19, wherein the pointer records in the boot sector of the primary, secondary and tertiary data arrays store indicators corresponding to the serial numbers of the primary, the secondary and the tertiary data arrays, and wherein the pointer records in the boot sector of the primary, secondary and tertiary data arrays store also store a reconfiguration count and a timestamp, the method further comprising:
   determining by the director node whether a data array is a global metadata array and whether a latest version of the global metadata is present in the data array.

22. The system of claim 19, wherein if a better quality data array in comparison to the primary data array is available for storing the global metadata then the global metadata is stored in the better quality data array in preference to the primary data array, wherein a location of the global metadata array is changed by copying a pointer record from primary metadata array to the new RAID array, and wherein the global metadata is copied from the primary data array to the new RAID array.

23. The system of claim 19, wherein each data array of the plurality of data arrays is owned by at least one but not by all of the plurality of nodes.

24. The system of claim 19, the operations further comprising:
   collecting the information about each of the data arrays by the director node;
   directly or indirectly reading via local and remote adapters, by the director node, a boot sector of each of the plurality of data arrays to determine which of the plurality of data arrays has a pointer record in the boot sector pointing to potential global metadata arrays; and
   determining, boot sectors with highest reconfiguration counts to determine three arrays of the plurality of data arrays that are configured as the current set of global metadata arrays.

* * * * *